(12) United States Patent
Eavenson, Sr. et al.

(10) Patent No.: US 7,302,789 B2
(45) Date of Patent: Dec. 4, 2007

(54) MECHANISM FOR DISCONTINUING POWER TO AN IMPLEMENT DRIVE DURING MACHINE REVERSE TRAVEL (NO POWER IN REVERSE) WITH AUTOMATIC REENGAGEMENT

(75) Inventors: Jimmy N. Eavenson, Sr., Aurora, OH (US); Guenter F. Plamper, Medina, OH (US)

(73) Assignee: MTD Products Inc, Valley City, OH (US)

( * ) Notice: Subject to any disclaimer, the term of this patent is extended or adjusted under 35 U.S.C. 154(b) by 121 days.

(21) Appl. No.: 10/538,824

(22) PCT Filed: Dec. 19, 2003

(86) PCT No.: PCT/US03/40723

§ 371 (c)(1),
(2), (4) Date: Jun. 13, 2005

(87) PCT Pub. No.: WO2004/057632

PCT Pub. Date: Jul. 8, 2004

(65) Prior Publication Data

US 2006/0123756 A1    Jun. 15, 2006

Related U.S. Application Data

(60) Provisional application No. 60/434,893, filed on Dec. 19, 2002.

(51) Int. Cl.
*A01D 69/08* (2006.01)

(52) U.S. Cl. .......................... 56/11.8; 180/6.48; 74/469

(58) Field of Classification Search ............... 180/6.48, 180/6.5, 19.3; 307/9.1, 10.6; 74/469, 471 R, 74/473.1, 473.12, 473.19, 473.3, 473.33, 74/473.35, 481; 123/334, 335; 56/11.4 LAD, 56/11.8

See application file for complete search history.

(56) References Cited

U.S. PATENT DOCUMENTS

| | | | |
|---|---|---|---|
| 3,969,875 A | | 7/1976 | Nofel |
| 3,984,967 A | | 10/1976 | Jones |
| 3,999,643 A | | 12/1976 | Jones |
| 4,662,646 A | | 5/1987 | Schlapman et al. |
| 5,138,995 A | * | 8/1992 | Erhard ........................ 123/335 |
| 5,228,360 A | * | 7/1993 | Johnson ...................... 74/512 |
| 5,252,791 A | * | 10/1993 | Williams ................... 200/11 C |
| 5,390,479 A | | 2/1995 | Hutchison et al. |

(Continued)

*Primary Examiner*—Árpád Fábián Kovács
(74) *Attorney, Agent, or Firm*—Wegman, Hessler & Vanderburg

(57) ABSTRACT

An apparatus, systems and methods for automatically disengaging and re-engaging a cutting implement on a mowing machine by disconnecting and connecting, respectively, electrical power to an implement drive means. Power to the implement drive means is disconnected or connected according to gear positions of transmission control levers provided on the mowing machine. At designated gear positions, cut-out switches associated with the implement drive means are effective to interrupt power to the implement drive means. Repositioning the control levers to non-designated gear positions restores power to the implement drive means. The automatic disengagement/re-engagement of the cutting implement based on the gear position of transmission control levers may be used for two lever zero-turn-ride-on mowing machines or more traditional single lever ride-on mowing machines.

11 Claims, 5 Drawing Sheets

U.S. PATENT DOCUMENTS

| | | |
|---|---|---|
| 6,026,634 A | 2/2000 | Peter et al. |
| 6,085,502 A | 7/2000 | Wians et al. |
| 6,105,348 A * | 8/2000 | Turk et al. .................. 56/10.5 |
| 6,109,010 A | 8/2000 | Heal et al. |
| 6,199,354 B1 * | 3/2001 | King et al. .................. 56/11.3 |
| 6,237,311 B1 | 5/2001 | Richards |
| 6,316,891 B1 | 11/2001 | Hough |
| 6,437,458 B1 | 8/2002 | Baggett |
| 6,513,310 B1 | 2/2003 | Hancock et al. |
| 6,568,162 B2 | 5/2003 | Walters |
| 6,578,656 B2 | 6/2003 | Samejima et al. |
| 6,591,594 B2 | 7/2003 | Hancock et al. |
| 6,601,663 B2 | 8/2003 | Hauser |
| 2003/0056480 A1 | 3/2003 | Johnson |
| 2003/0097829 A1 | 5/2003 | Hancock et al. |
| 2005/0039430 A1 * | 2/2005 | Samejima et al. ......... 56/320.2 |

* cited by examiner

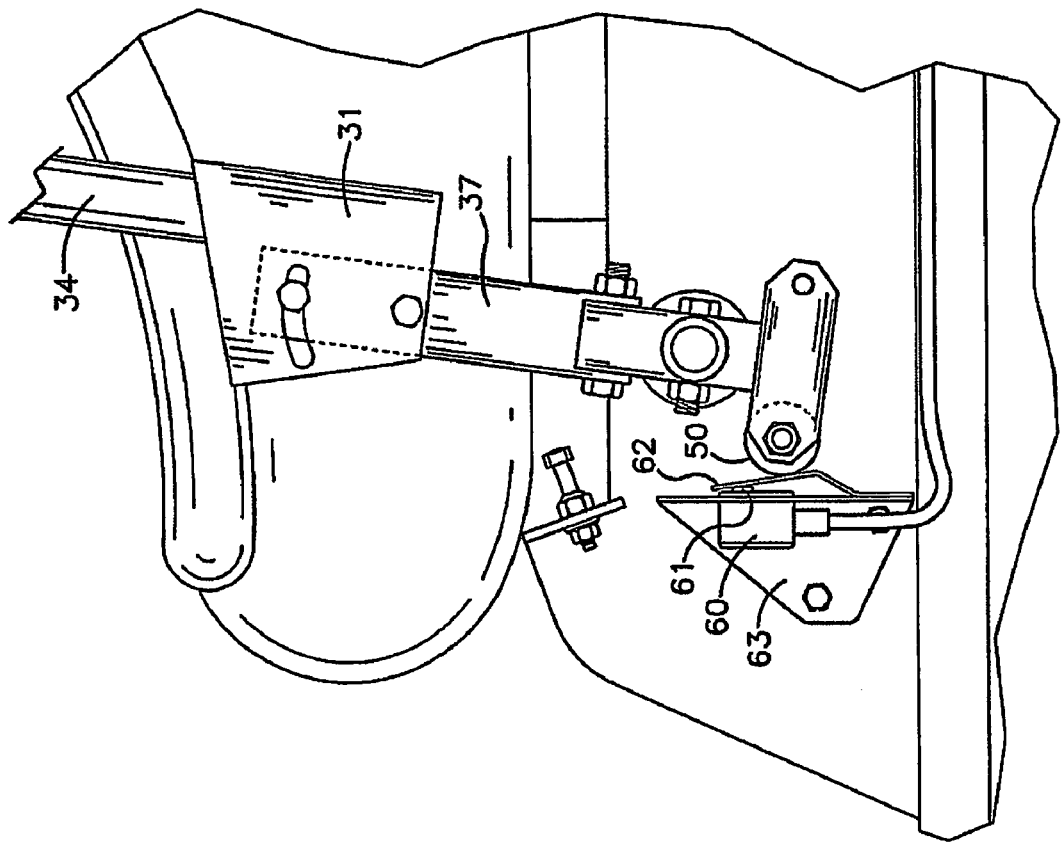
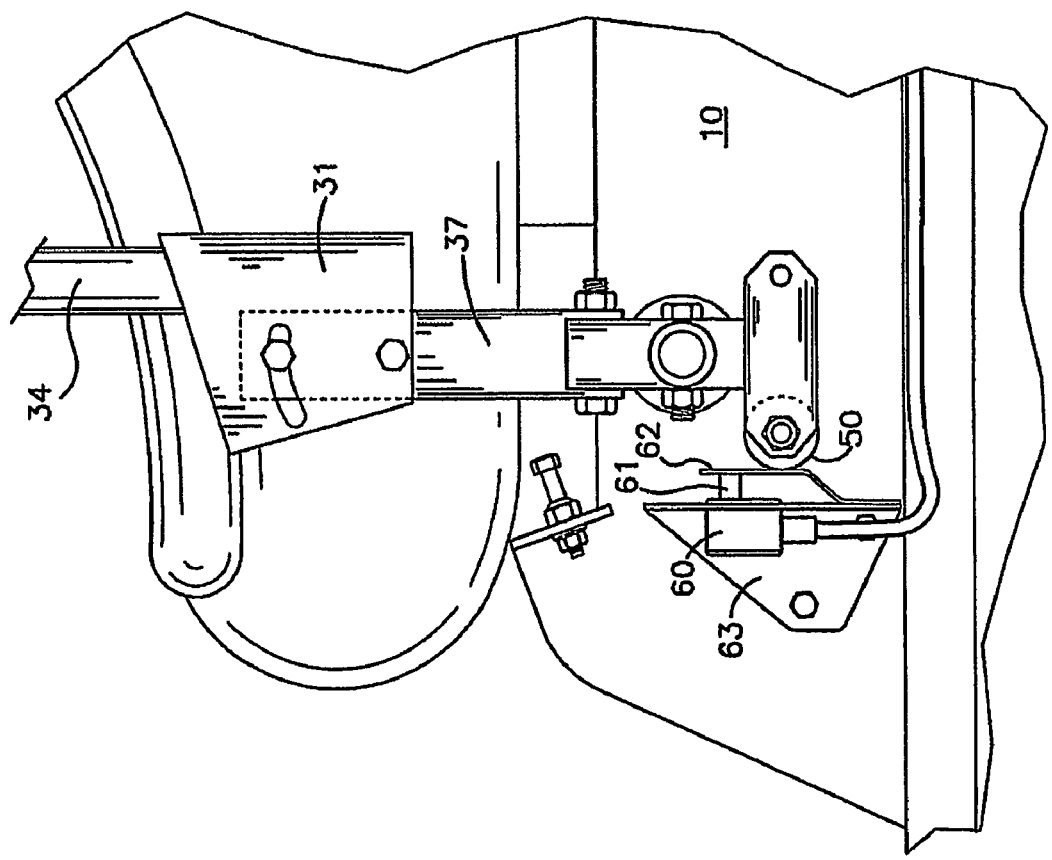

MECHANISM FOR DISCONTINUING POWER TO AN IMPLEMENT DRIVE DURING MACHINE REVERSE TRAVEL (NO POWER IN REVERSE) WITH AUTOMATIC REENGAGEMENT

CROSS-REFERENCE TO RELATED APPLICATIONS

This application claims the priority filing benefit of International PCT application PCT/US2003/040723 filed Dec. 19, 2003, and published under PCT 21(2) in the English language; and U.S. Provisional Patent Application Ser. No. 60/434,893 filed Dec. 19, 2002.

BACKGROUND OF THE INVENTION

1. Field of Invention

This invention relates to lawn/turf mowing machines, and more particularly to an implement governing mechanism and method for such machines.

2. Description of Related Art

Lawn/turf mowing machines are well-known. Such machines commonly have a separably operable engine and cutting deck mounted on a chassis. A gear shift lever, positioned in either forward gear or a reverse gear by the operator, controls the direction of travel of the mowing machine.

Industry has recognized the safety concerns posed by mowing machines having cutting blades engaged when the mowing machines travel in a reverse direction. For example, U.S. Pat. No. 3,984,867 provides a mechanical interlock preventing cutting in reverse. U.S. Pat. No. 3,999,643 discloses a mower having a transmission lever that, in the reverse position, opens a switch to disengage an electric clutch operatively associated with the cutting blade. Newly proposed 2003/2004 ANSI Safety Standard requires a No Mow In Reverse (NMIR) feature on mowing machines. U.S. Pat. No. 6,026,634 also discloses disengagement of the cutting blades when a zero turn radius (ZTR) mowing machine is in full reverse gear.

Current technology for precluding the engagement of cutting blades for self-propelled and ride-on machines includes:

a. A mechanical means that blocks reverse drive of the mowing machine when cutting blades are engaged.
b. An electronic means that blocks reverse drive of the mowing machine when cutting blades are engaged.
c. An electronic means that automatically disconnects power to the cutting blades when the mowing machine's directional control is changed into Reverse. These systems are usually equipped with a "latching relay" that requires the system to be reset to re-engage the cutting blades in machine "Neutral" or "Forward" travel directions.
d. A mechanical means that disconnects power to the cutting blades when the mowing machine's directional control is changed to Reverse and requires the system to be reset to re-engage the cutting blades when the machine direction control is returned to Neutral or Forward travel directions.

In a and b above, shifting into reverse is prevented, whereas in c and d above, use of the cutting blades is prevented until the system is reset. In order to satisfy the above safety concerns about cutting in reverse while still allowing for optimal operator convenience, it is desirable to provide a lawn/turf mowing machine in which the cutting blades are automatically disengaged in reverse and then automatically re-engaged solely by shifting the mowing machine into an appropriate gear position.

SUMMARY OF THE INVENTION

Various exemplary embodiments of the apparatus, systems, and methods according to the present invention provide for the automatic disconnection or connection of power to an implement drive means, for example an electrical blade clutch, of a mowing machine. Power to the implement drive means can be automatically disconnected or connected solely by the respective positioning of the mowing machine's transmission control levers. The present system does not require the machine operator to activate a separate reset switch in order to disconnect or reconnect power to the implement drive means. In all of the various embodiments of the invention, the engine of the mowing machine continues to run regardless of the operational state of the implement drive means.

In one aspect of the present invention, the mowing machine comprises a pair of transmission control levers which selectively control the position of a corresponding pair of parallel connected cut-out switches. The parallel connected cut-out switches in turn control the flow of current to the implement drive means. According to this particular embodiment, at least one of the parallel switches must be closed in order to connect power to the implement drive means; that is, at least one of the transmission control levers must be positioned in forward or neutral gear.

In other embodiments of the invention, for example, where a single transmission control lever is provided on the mowing machine, a single cutout switch is used to control the flow of current to the implement drive means. In this alternative embodiment, the single cut-out switch must be closed in order to connect power to the implement drive means; that is, the single transmission control lever must be shifted out of reverse. However, in any of the exemplary embodiments of the present invention disclosed herein, the power to the implement drive means can be controlled solely by the respective positioning of the transmission control lever(s).

Automatic disengagement and subsequent reengagement of the cutting implement means is suitable for a variety of mowing machines including, but not limited to, zero turn ride on (ZTR) machines having two transmission control levers, or for more traditional ride-on mowing machines having a single transmission control lever. Such automatic disengagement and reengagement of the implement drive means based on the positioning of the transmission control levers provides increased operator convenience and complies with the proposed safety standards.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention will be described in detail with reference to the following figures, wherein:

FIG. 5 illustrates an exemplary ZTR transmission control lever in a neutral gear position; and FIG. 6 illustrates an exemplary ZTR transmission control lever in a reverse gear position.

DETAILED DESCRIPTION OF EXEMPLARY EMBODIMENTS

Figure 1:
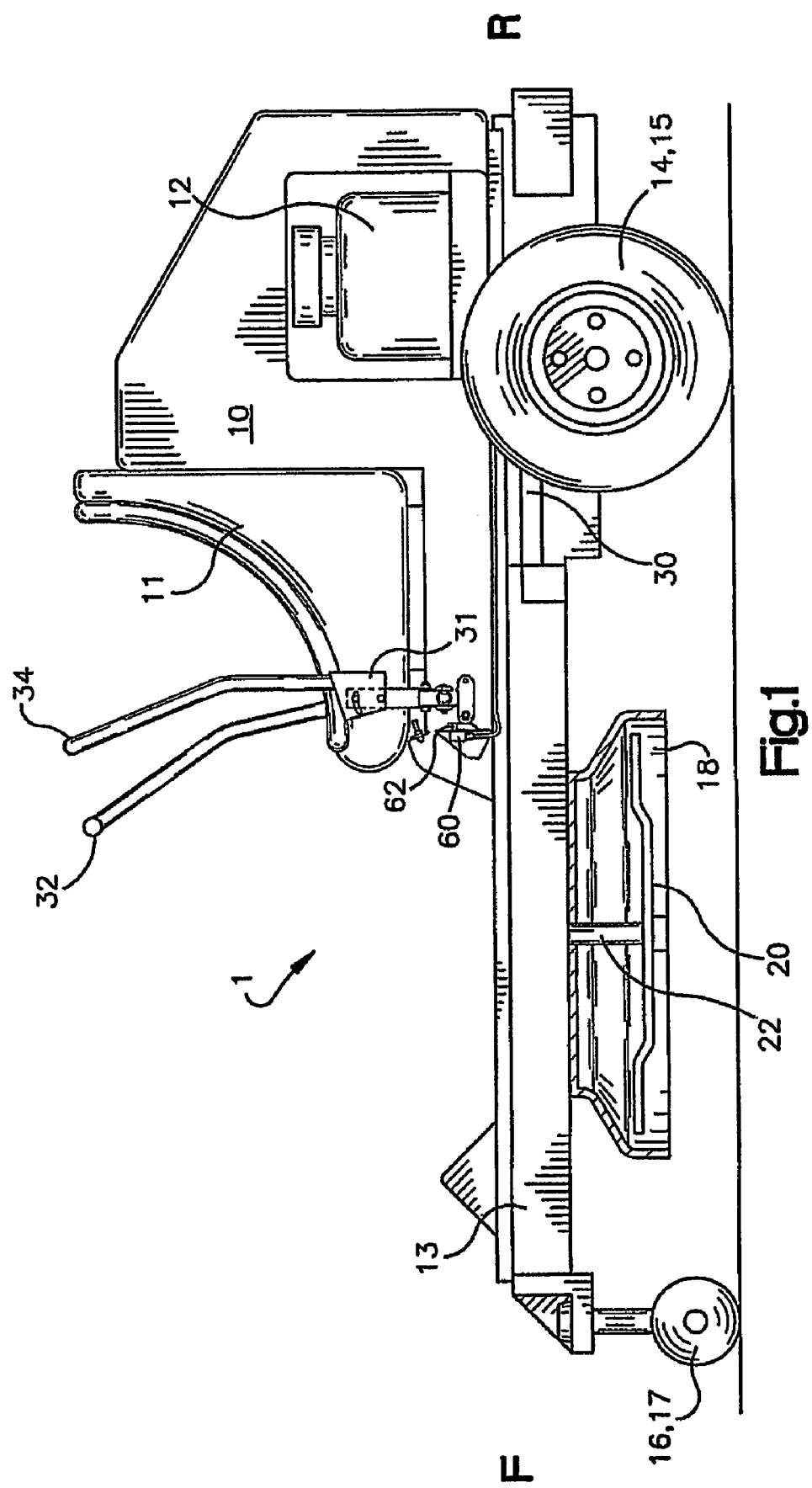
FIG. 1 illustrates an exemplary embodiment of a two-control lever ZTR mowing machine according to the invention.

FIG. 1 shows an exemplary two-control lever ZTR mowing machine 1 according to one embodiment of the invention. The ZTR mowing machine 1 is comprised of a frame 10 supporting an operator seat 11, an engine 12 to the rear of the operator seat, and a foot platform 13 to the front of the operator seat. Right and left drive wheels 14, 15 are provided to the rear of the mowing machine 1. Right and left driven wheels 16, 17 are provided to the front of the mowing machine. A grass cutting unit 18 is provided under the foot platform 13. The grass cutting unit 18 includes a cutting implement 20, such as cutting blades, attached to a spindle axle 22. An implement drive means 24 (FIG. 4), such as an electric blade clutch, for example, drives the spindle axle 22 to engage the blades 20. A controllable accessory power take off drive (PTO) is electrically coupled to the electric blade clutch via a PTO switch 111. The PTO switch has "ON" and "OFF" positions. When the PTO switch is in an "ON" position, the PTO may be connected with the electric blade clutch to engage the cutting blades, and when the PTO switch is in the "OFF" position, the PTO is not connected to the electric blade clutch and the cutting blades are not engaged. Cut-out switches 60 determine whether the PTO is connected or disconnected with the electric blade clutch when the PTO switch is in the "ON" position.

A transmission system 30 comprises right and left speed/directional control levers 32, 34 that are manually shiftable by an operator between forward, neutral and reverse gear positions. The control levers are pivotably mounted to the foot platform 13, or frame 10, on either side of the operator's seat 11, for example. Each of the right and left control levers 32, 34 are associated with a corresponding right and left drive transaxle 70. Each transaxle 70 governs the speed and direction of rotation of the corresponding right and left drive wheels 14, 15 based on the gear position of each control lever 32, 34. The control levers 32, 34 are independently operable whereby positioning both control levers into a forward gear position towards a front F of the mowing machine causes the mowing machine to travel in a generally straight and forward direction, whereas positioning both control levers into a reverse gear position towards the rear R of the mowing machine causes the mowing machine to travel in a generally straight and reverse direction. Positioning one of the control levers into a forward or reverse gear position and positioning of the other of the control levers into one of a neutral or opposite gear position causes turning of the mowing machine.

Figure 2:
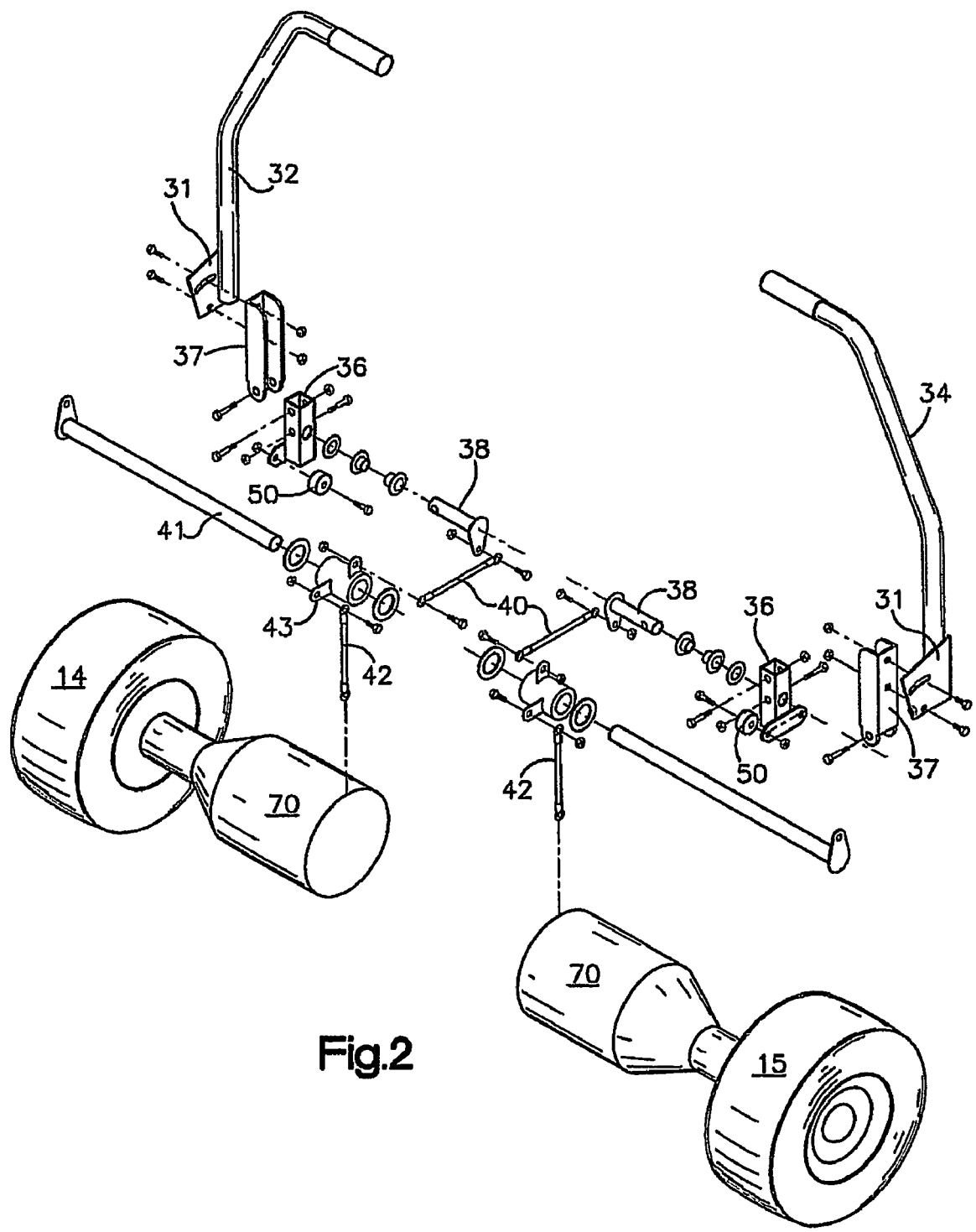
FIG. 2 illustrates an exploded view of various transmission control lever components of the exemplary ZTR of FIG. 1.

FIG. 2 shows, more specifically, various components associated with each of the control levers 32, 34. A plate 31 connects each of the control levers to the mowing machine. Each plate 31 is mounted to a bracket 37 which is in turn connected to a pivot weldment 36. Each pivot weldment 36 is connected to a pivot shaft 38. The pivot shafts 38 are then each connected to linkages 40, 41, 42. A universal coupling 43 coordinates the interface of the various linkages 40, 41, 42 with one another. Each linkage 42 also connects to a respective drive transaxle 70 to translate power to an associated one of the right and left drive wheels 14, 15 of the mowing machine 1 via conventional means according to the selected gear position. For example, the linkage 42 associated with the right control lever 32 is connected with the drive transaxle 70 that drives the right drive wheel 14, whereas the linkage 42 associated with the left side control lever 34 is connected with the drive transaxle 70 that drives the left drive wheel 15. The connections between the various components described herein may be by combinations of nuts, bolts, and washers as generally shown, or by other known or later developed connection structures suitable to accommodate the necessary motions to the linkages 40, 41, 42 or other components required in this system.

Figure 3:
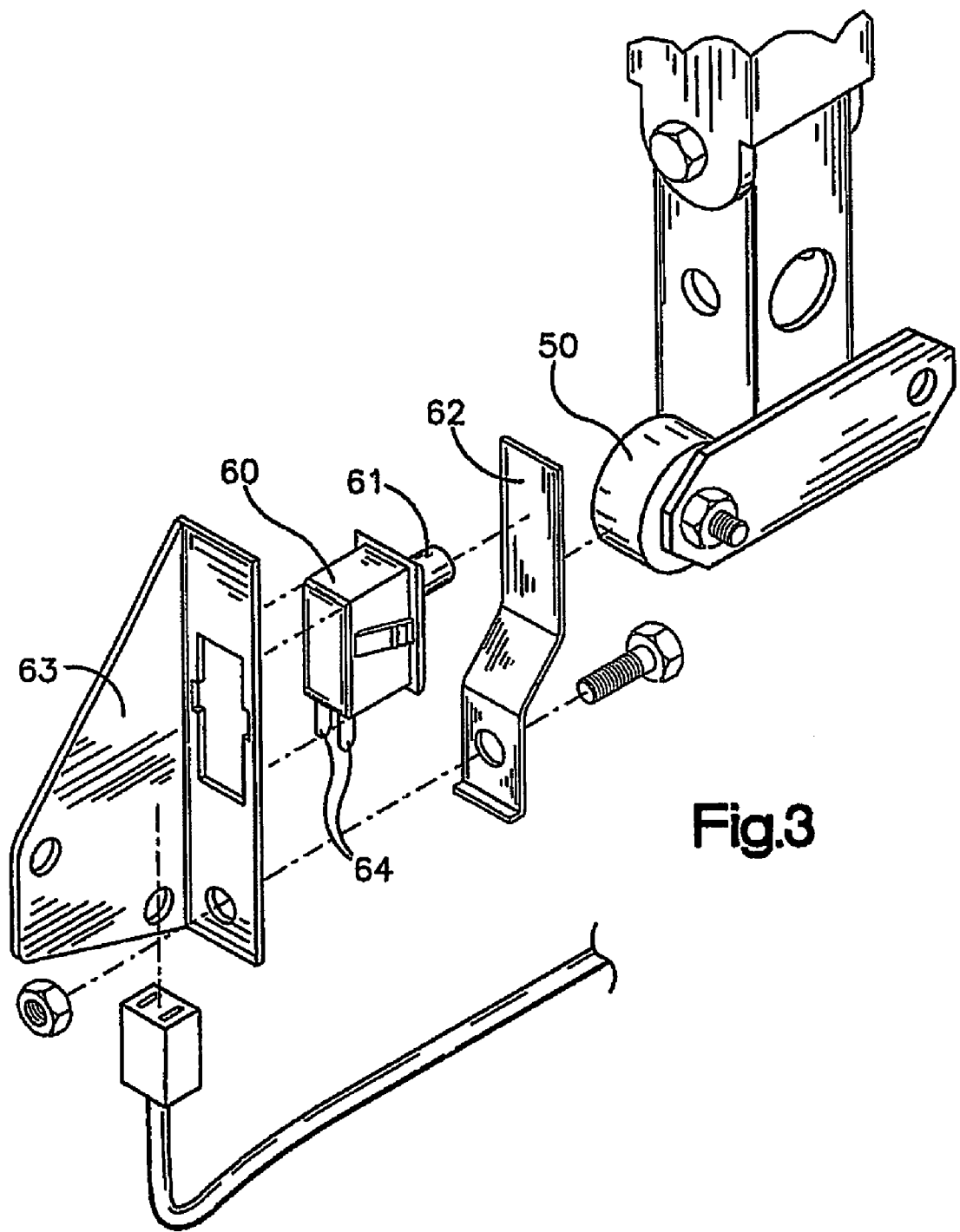
FIG. 3 illustrates an exemplary disengagement/re-engagement device according to the invention.

FIG. 3 shows an exemplary two-position, normally closed cut-out switch 60 according to the invention. Each cut-out switch 60 includes a plunger 61, a leaf spring 62, a mounting bracket 63, and an electrical coupler 64. Depression of the plungers 61 by biasing contact of the control levers with the leaf springs 62 renders the cut-out switches 60 open, whereas extension of the plungers by non-biasing contact of the leaf springs 62 with the control levers returns the cut-out switches 60 to their normally closed state. The position of the control levers 32, 34 thus controls the speed/direction of the mowing machine and the open or closed state of the cut-out switches 60.

Referring to FIGS. 1-3, right and left cut-out switches 60 are mounted, via brackets 63, to right and left sides of the mowing machine. Each cut-out switch is mounted within contacting range of a corresponding one of the control levers 32, 34 such that sufficient contact by one of the control levers biases a corresponding leaf spring to depress a plunger. The cut-out switches 60 are mounted such that the leaf springs 62 are in biasing contact with the plungers 61 so that the plungers are depressed when a corresponding control lever is shifted into at least the reverse gear position. When the plungers 61 are not in biasing contact with a control lever, the plungers extend. Depression of the plungers corresponds to the open state of the cut-out switches, whereas extension of the plungers corresponds to the closed state of the cut-out switches.

In a particularly preferred embodiment of the invention, referring still to FIGS. 1-3, each cut-out switch 60 is mounted to the frame 10 of the mowing machine below the operator's seat 11 and to the front of the control levers 32, 34. At a bottom of each control lever, a pivot weldment 36 is provided with a roller 50. As the control levers are shifted into a reverse gear position, for example, the roller 50 biasingly contacts, or attaches, to the leaf springs 62 of the cut-out switches 60. When so contacted, each leaf spring 62 depresses the plungers 61 rendering the cut-out switches 60 open. As a result, the connection between the electric blade clutch 24 and the PTO is broken and power to the electronic blade clutch 24 is interrupted. When power to the electric blade clutch 24 is interrupted, the cutting blades 20 are automatically disengaged. Repositioning at least one of the control levers 32, 34 into one of the neutral or forward gear positions, for example, results in the respective plunger 61 extending, thereby closing the cut-out switch 60 and completing the connection between the electric blade clutch and the PTO. Therefore, extending the plunger of at least one cut-out switch effectively provides power to the electric blade clutch 24 and automatically re-engages the cutting blades 20.

According to various other embodiments of the invention, as the artisan should appreciate, the cut-out switches 60 may be mounted at a variety of locations on the mowing machine and still be within biasing contact range of the control levers such that the cutting blades are automatically disengaged whenever the control levers are in the reverse gear position. The exemplary embodiment shown in FIG. 1 shows the cut-out switches 60 mounted to the frame 10 in front of the control levers 32, 34 on either side of the mowing machine. The artisan should readily appreciate that the cut-out switches 60 could as well be mounted to the frame 10 to the rear of the control levers, or to the foot platform 13 to the front or rear of the control levers provided the cut-out switches are within biasing contact range of the levers 32, 34 when the control levers are in a reverse gear position.

Figure 4:
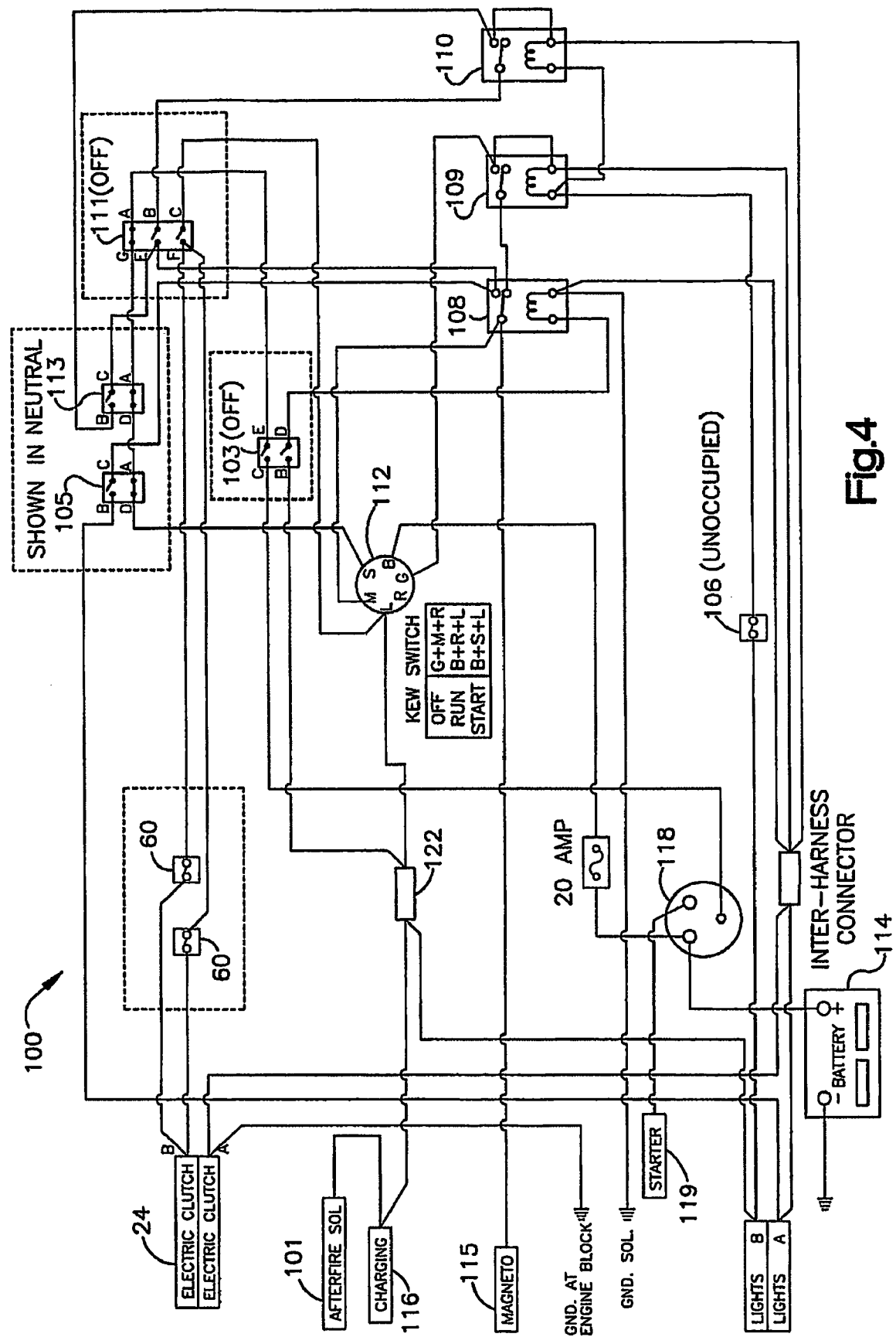
FIG. 4 illustrates an exemplary circuit diagram of the ZTR system of FIGS. 1-3.

Referring now to FIG. 4, there is shown a detailed electric control circuit 100 for the mowing machine 1. The electric control circuit includes a two-position PTO switch 111 having a ganged movable contact arrangement 111A-G, 111B-E, and 111C-F. Each ganged movable contact arrangement is simultaneously movable between the respective OFF and ON positions. When the PTO switch 111 is in the OFF position (as shown), movable contact arrangement 111A-G is closed, while movable contact arrangements 111B-E and 111C-F are open. When the PTO switch is in the ON position, movable contact arrangement 111A-G is open, while movable contact arrangements 111B-E and 111C-F are closed.

Movable PTO contact terminal 111A is connected to solenoid 118 via movable contact arrangement 103E-C of brake switch 103. Fixed PTO contact terminal 111G is connected to normally closed terminals 105A, 113A of transmission switches 105, 113 (shown in neutral) and starter terminal 112S of key switch 112. In operation, if the PTO switch 111 is OFF (as shown), a complete connection is made between starter terminal 112S and solenoid 118, so long as certain conditions are satisfied. Those conditions are satisfied when brake switch terminal 103E-C is closed, seat switch 106 is open (seat occupied), and transmission switches 105, 113 are in neutral (as shown). Under these conditions, if the operator turns key switch 112 to the START position, contact is made between battery terminal 112B, starter terminal 112S, and lights terminal 112L. This permits current from battery 114 to energize the solenoid 118 and activate the starter 119, thereby starting the engine.

Once the engine is started, key switch 112 automatically moves from the START to RUN position. When the key switch moves to the RUN position, connection is made between battery terminal 112B, regulator terminal 112R, and lights terminal 112L. Accordingly, connection between battery 14 and regulator terminal 112R permits the regulation of gas and fuel to the engine and the engine will continue to run. If the operator leaves the seat while the engine is running, seat switch 106 returns to its normally closed position, allowing current (via inter-harness connector 122) to activate second relay 109 and third relay 110, thereby providing a ground path (via non-activated first relay 108) for magneto 115. Accordingly, the engine will stop running.

The electric control circuit 100 further includes parallel connected cut out switches 60. The cut-out switches are connected in series/parallel; that is, the cut-out switches are connected in parallel with each other and connected in series between the electric blade clutch 24 and PTO contact terminal 111F. When the PTO switch 111 is ON, movable contact terminals 111B and 111C are closed to engage their respective fixed contacts 111E and 111F, while movable contact 111A is opened from its respective fixed contact 111G. In operation, assuming brake switch 103 is OFF (as shown) and PTO switch 111 is ON, a complete circuit is provided between the charging unit 116, battery 114 and electric blade clutch 24 via closed PTO contact arrangement 111F-C, thereby energizing the electric blade clutch 24 and engaging the cutting blades 20. If one of the cut-out switches 60 is open, as by depression of its plunger 61, and the other parallel cut-off switch remains closed, a closed current path is still provided to the electric clutch blade 24 via the remaining closed parallel circuit branch so that current continues to energize electric blade clutch 24, thereby allowing the cutting blades 20 to remain engaged. On the other hand, if both of the cut-out switches 60 are open, as by depression of both of their plungers 61, the current path in both parallel branches between PTO terminal 111F and electric blade clutch 24 is interrupted, thereby de-activating the electric blade clutch and disengaging the cutting blades. Accordingly, when in a "full" reverse position with both of the plungers depressed, the cutting blade is not engaged by the electric switch. Once one of the plungers is extended (i.e., not depressed), the electric blade clutch is again activated, connecting the drive system to the cutting blade(s).

FIG. 5 illustrates an example of one of the control levers in a neutral gear position whereby the leaf spring 62 associated with cut-out switch 60 is not contacted, and the plunger 61 is not depressed. Conversely, FIG. 6 illustrates an example of a control lever in a reverse gear position whereby the roller 50 is in biasing contact, or attaches, to the leaf spring 62, thereby depressing the plunger 61 of the cut-out switch 60.

In operation, assuming the transmission is in neutral, brake switch 103E-C is closed, and the operator seat is occupied, the mowing machine is started by turning the key switch 112 to the START position. Once the mowing machine is started, the key switch 112 automatically moves to the RUN position. Once the mowing machine is running, the cutting blades can be engaged by turning the PTO switch to the "ON" position. When the PTO switch is in the "ON" position, electrical connection between the PTO and the electric blade clutch is achieved so that the electric blade clutch drives the cutting blades. The operator then positions each of the transmission control levers to a desired forward, neutral or reverse gear position. The cutting blades remain engaged so long as at least one of the transmission control levers is in a neutral or forward gear position. When both of the transmission control levers are in the reverse gear position, i.e., in "full" reverse, the bottom portion of each control lever depresses the plunger of a corresponding one of the cut-out switches. As a result, the PTO is electrically disconnected from the electric blade clutch and the cutting blades are disengaged. Positioning either, or both, of the control levers to a non-reverse, i.e., neutral or forward, gear position causes a corresponding cut-out switch plunger to extend. Accordingly, extension of one, or both, cut-out switch plungers electrically re-connects the PTO with the electric blade clutch and automatically re-engages the cutting blades.

The systems and methods described herein thus incorporate a minimal number of components arranged to automatically disconnect and connect power to the electric blade clutch that drives the cutting blades. Automatic disengagement and re-engagement of the cutting blades is achieved as a result. Further, positioning of each of the control levers by rotary motion, as opposed to linear motion, to directly activate or de-activate a plunger of the various cut-out switches permits the cut-out switches to be mounted at a variety of positions. Further, the direct activation of the cut-out switches by the rotary motion of the transmission control levers increases the range whereat automatic disengagement and re-engagement of the cutting blades will occur, and minimizes variations that might otherwise occur due to mis-alignment of parts.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A mowing machine comprising:
   a frame;
   an engine;
   a cutting blades rotatably mounted to the frame via an electric blade clutch;
   a controllable accessory power take off drive (PTO) electrically coupled with the electric blade clutch;
   a PTO switch associated with the PTO and the electric blade clutch, the PTO switch having "ON" and "OFF" positions such that the PTO may energize the electric blade clutch when the PTO is in the "ON" position and electrical connection between the PTO and electric blade clutch exists;
   a pair of cut-out switches electrically connected to the PTO and the electric blade clutch;
   a transmission system governing the speed and rotational direction of corresponding right and left drive wheels;
   a pair of transmission control levers operatively associated with the transmission system, each of the control levers being selectably movable into one of a forward, neutral or reverse gear position corresponding to a desired speed and direction of travel of the right or left drive wheels;
   each of the cut-out switches being mounted to the mowing machine for selective contact or non-contact by a corresponding one of the control levers whereby the cut-out switches electrically connect the PTO with the electric blade clutch and engage the cutting blades when either or both of the cut-out switches are in a first position and the PTO switch is "ON" and disconnect the PTO from the electric blade clutch and disengage the cutting blades when both of the cut-out switches are in a second position, and contact or non-contact positioning of the control levers with the switches determines whether the cut-out switches are in the first position or the second position, whereby the cutting blades may be automatically engaged by placing one of said cut-out switches in the first position after both of said switches have been in said second position.

2. The mowing machine of claim 1, wherein each cut-out switch further comprises:
   a mounting bracket;
   an electrical coupler;
   a leaf spring; and
   a plunger,
   wherein each electrical coupler connects one of the cut-out switches with the PTO and the blade clutch, and each mounting bracket mounts one of the cut-out switches to the mowing machine, each cut-out switch being mounted such that biasing contact of each of the leaf springs by a corresponding one of the control levers depresses the plungers, thereby placing the cut-out switches into the second position, and non-biasing contact of each of the leaf springs by the corresponding control levers extends the plungers, thereby returning the cut-out switches to the first position.

3. The mowing machine of claim 2, wherein depression of the plunger occurs when a corresponding one of the control levers is placed into the reverse gear position.

4. The mowing machine of claim 2, wherein extension of the plunger occurs when a corresponding one of the control levers is placed into one of the neutral or forward gear positions.

5. The mowing machine of claim 2, wherein depression of the plunger occurs when a corresponding one of the control levers is placed into either of the neutral or reverse gear positions.

6. The mowing machine of claim 5, wherein positioning of either of the control levers in the forward gear position causes a corresponding cut-out switch plunger to extend, thereby placing the corresponding cut-out switch in its first position, re-connecting the PTO and the electric blade clutch, and re-engaging the cutting blades.

7. The mowing machine of claim 2, wherein each cut-out switch is arranged in parallel relative to one another and in series between the electric blade clutch and the PTO.

8. The mowing machine of claim 2, wherein a bottom portion of each control lever contacts a corresponding one of the leaf springs.

9. The mowing machine of claim 8, the bottom portion of each control lever further comprises:
   a plate;
   a sleeved bracket;
   a pivot weldment;
   a pivot shaft;
   a set of linkages,
   wherein one side of each plate is mounted to the mowing machine and another side of each plate is mounted to the sleeved bracket, each pivot weldment is received in one of the sleeved brackets and is connected to one of the pivot shafts, each pivot shaft is connected to the one set of linkages, each set of linkages being associated with a corresponding right drive transaxle or left drive transaxle, whereby the one set of linkages determines the speed and rotational direction of a right drive wheel and the other set of linkages determines the speed and rotational direction of a left drive wheel according to the gear positions of each control lever.

10. A method of automatically disengaging and re-engaging cutting blades of a mowing machine, the method comprising:
    providing the mowing machine having an engine, a transmission, a pair of transmission control levers, a controllable accessory power take off drive (PTO) coupled to an electric blade clutch, a PTO switch having an "ON" and "OFF" position, the cutting blades engagable by the electric blade clutch, and a pair of cut-out switch between the electric blade clutch and the PTO, each cut-out switch having a first position that connects the PTO with the electric blade clutch when the PTO switch is "ON" and at least one cut-out switch is in the first position, and a second position that disconnects the PTO from the electric blade clutch when all cut-out switches are in the second position;
    starting the engine;
    turning the PTO switch to an "ON" position;
    shifting at least one of the transmission control levers into a non reverse gear position to place at least one cut-out switch into the first position thereby connecting the PTO with the electric blade clutch and engaging the cutting blades;

shifting all of the transmission control levers into the reverse gear position to place all of the cut-out switches into the second position thereby disconnecting the PTO switch from the electric blade clutch and disengaging the cutting blades; and shifting at least one of the transmission control levers into one of the non-reverse gear positions to place at least one of the cut-out switches into the first position thereby re-connecting the PTO with the electric blade clutch and re-engaging the cutting blades.

11. The method of claim 10, wherein the mowing machine is a the pair of transmission levers ZTR mowing machine and the cut-out switches are in parallel relative to one another and in series between the PTO switch and the electric blade clutch.

* * * * *